(12) United States Patent
Jarvis

(10) Patent No.: US 12,392,920 B2
(45) Date of Patent: Aug. 19, 2025

(54) MAGNETIC STRUCTURAL MEMBER FINDER

(71) Applicant: Luke Jarvis, San Diego, CA (US)

(72) Inventor: Luke Jarvis, San Diego, CA (US)

(*) Notice: Subject to any disclaimer, the term of this patent is extended or adjusted under 35 U.S.C. 154(b) by 168 days.

(21) Appl. No.: 18/008,020

(22) PCT Filed: Jun. 4, 2021

(86) PCT No.: PCT/US2021/036001
§ 371 (c)(1),
(2) Date: Dec. 2, 2022

(87) PCT Pub. No.: WO2021/248067
PCT Pub. Date: Dec. 9, 2021

(65) Prior Publication Data
US 2023/0243995 A1 Aug. 3, 2023

Related U.S. Application Data

(60) Provisional application No. 63/034,734, filed on Jun. 4, 2020.

(51) Int. Cl.
*G01V 3/08* (2006.01)
*G01V 3/15* (2006.01)

(52) U.S. Cl.
CPC . *G01V 3/08* (2013.01); *G01V 3/15* (2013.01)

(58) Field of Classification Search
CPC .................................. G01V 3/08; G01V 3/15
See application file for complete search history.

(56) References Cited

U.S. PATENT DOCUMENTS

| | | | | |
|---|---|---|---|---|
| 2011/0267050 A1* | 11/2011 | Flores | ................... | G01R 33/02 |
| | | | | 324/259 |
| 2015/0091553 A1* | 4/2015 | Wong | ...................... | G01V 3/15 |
| | | | | 324/207.11 |

* cited by examiner

*Primary Examiner* — Alvaro E Fortich
(74) *Attorney, Agent, or Firm* — FisherBroyles, LLP; Thomas J. Osborne, Jr.

(57) ABSTRACT

A device and method adapted to determine a location of stud members within a wall or other structure are provided. A stud finder includes, in one implementation, a body for housing a magnet, with a front section and back section, and a magnet, the magnet being axially magnetized. The body is shaped in order to ensure these axially magnetized poles are always substantially facing the wall, and metal fasteners, when in use. In some embodiments, the magnet may be disposed within a range of 1 to 45 degrees from a surface of the housing. When the magnet moves in response to passing over a metal fastener, it snaps against the body, making a noise and alerting the user of a metal fastener. With even minimal magnetic attraction, as is the case with screws buried deep within the wall, the magnet can still be moved, make noise, and alert the user.

24 Claims, 8 Drawing Sheets

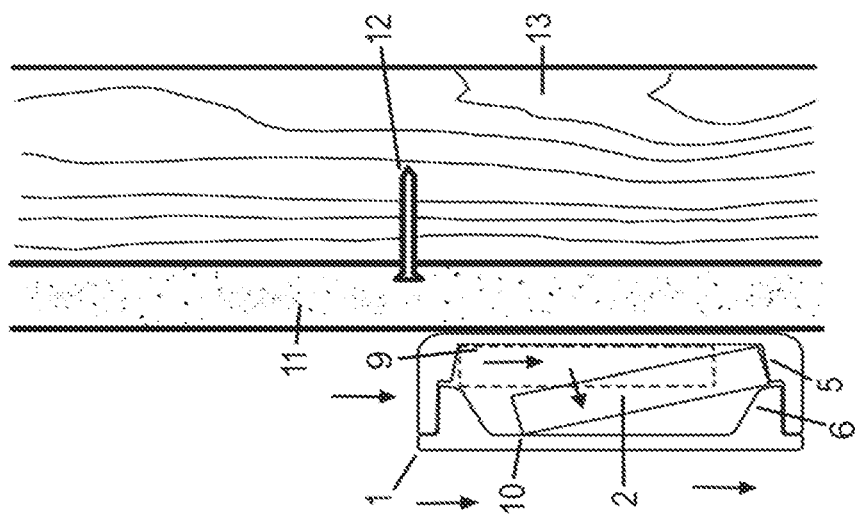
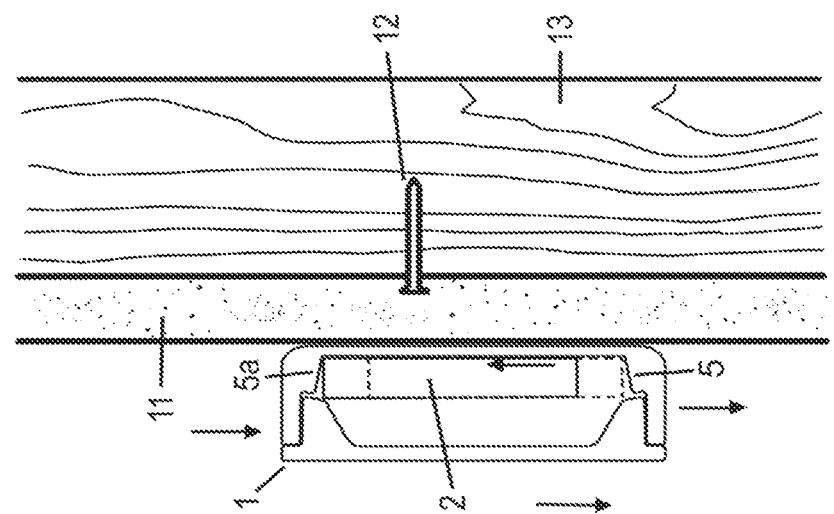

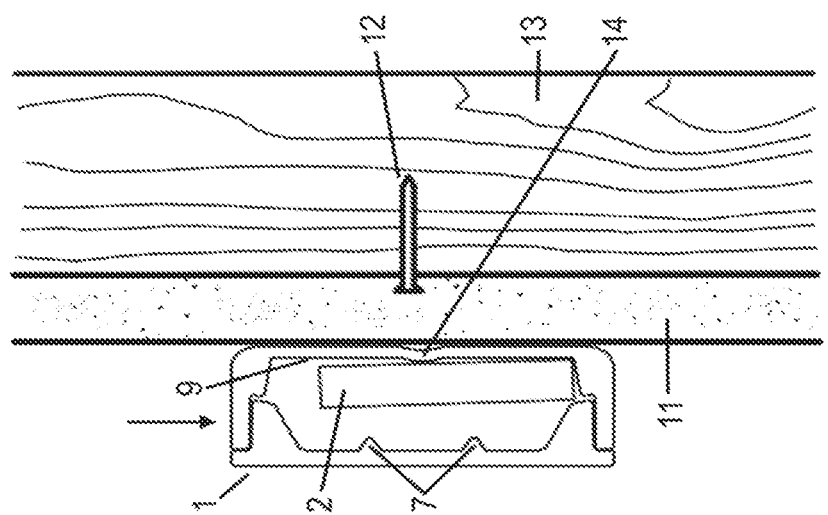
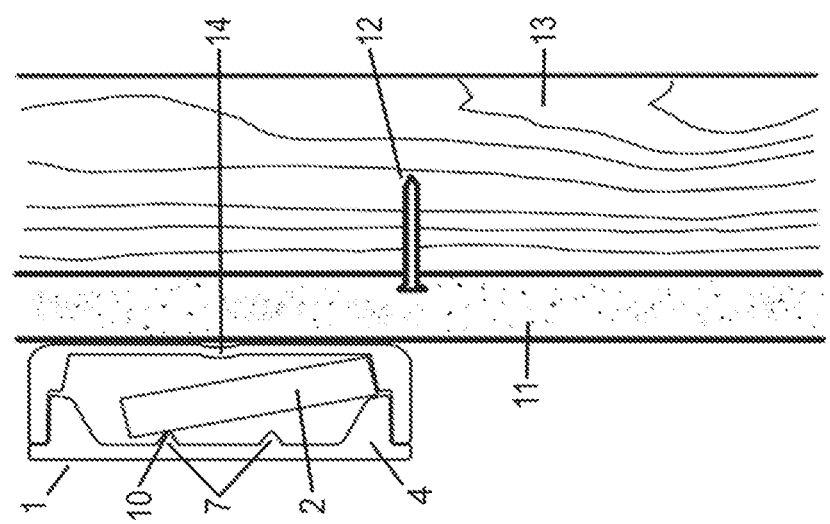

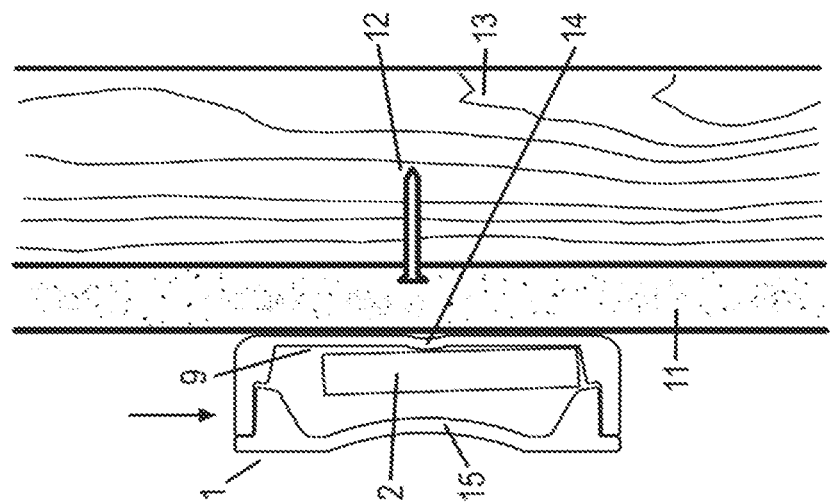
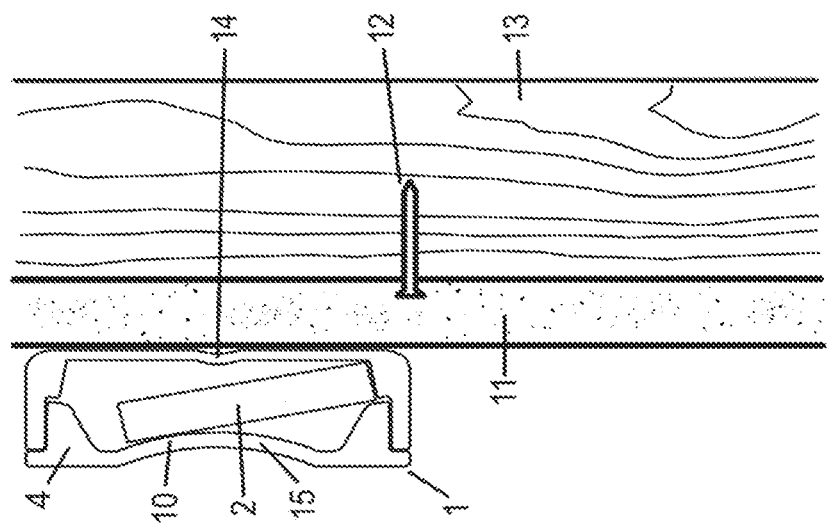

MAGNETIC STRUCTURAL MEMBER FINDER

CROSS-REFERENCE TO RELATED APPLICATIONS

This application claims the benefit of U.S. provisional application No. 63/034,734, filed 4 Jun. 2020 which is hereby incorporated by reference as though fully set forth herein.

BACKGROUND a. Field

The present disclosure relates to magnets being used to locate hidden stud members.

b. Background

It has long been a need for people to find hidden stud members within a wall surface. Whether trying to mount a television, cabinets, or shelving; it is often desirable to locate these stud members to attach to. Henceforth, the term "stud member" may refer to all structural members; including, but not limited to, ceiling joists, floor joists, rafters, and wall studs.

Before stud finders, people simply tapped holes into the wall surface with a small nail until hitting the stud to locate them. Stud finders are intended to be used to locate hidden stud members with little or no damage to the wall itself. There are two main types of stud finder: electronic and magnetic.

Electronic stud finders work by using a sensor to determine a change in the density of the wall, and then assuming this change in density is a wall stud. The user is then alerted of this by a light coming on or a noise emitted from the device. While this is a good idea in principle, these sensors can also be triggered by pipes behind the wall, patches in the wall, or glitches in the device itself. Not to mention, the electronic stud finders that consistently work well are often too expensive to the average user. They also require batteries to operate.

Magnetic stud finders work by using magnets to locate the metal fasteners that are attached to hidden stud members. The user usually drags a device along the wall and when a metal fastener is passed over, the magnet is attracted to the fastener and pulls towards it in some capacity. Some devices work by having a magnet fixedly positioned within a body and rely on the user to feel this magnetic pull to locate the fastener. Others allow the user to see or hear when the magnet has moved as a result of passing over a metal fastener.

One example of a device with a fixated magnet within a body is U.S. Pat. No. 6,696,827. The user scans along the wall surface being probed until a magnetic tug is felt. Then the user lets the device pull itself towards the metal fastener until it becomes magnetically attached when hovering directly over the fastener. While this device is useful in locating stud members when the wall material in question is drywall, where the fasteners are located close to the surface, it falls short when the wall surface is lath and plaster, where the fasteners can be buried up to 1" below the surface. The reason for this is magnetic force decreases exponentially as the distance between a magnet and a metal fastener increases. So, the magnetic pull of the device is much slighter when fasteners are buried deeper into the wall. Since the user is responsible for feeling this slight magnetic pull to locate the fastener, they often scan over fasteners because the pull is imperceptible. This means that the process of locating a stud member takes much longer when fasteners are buried more than about ½" below the surface, and in some cases can't be completed because all fasteners are buried too deep below the surface.

In an effort to get around this, a different idea was presented that allowed the magnet to move on its own. U.S. Pat. No. 9,069,028 is an example of a stud finder that allows the magnet element to freely move about its magnetic field within a body. When the stud finder passes above a metal fastener, the magnet is attracted and moves within the body, alerting the user of a fastener. This eliminates the need for the user to feel the slight magnetic pull when scanning along the wall, making it easier to spot a metal fastener and therefore a stud. The problem with this design is the resting position of the magnet when in use means its strongest magnetic areas, the poles, are not facing the wall. This means the metal fastener must be substantially close to the surface of the wall for the magnet to become attracted and move as a result. As the metal fasteners are located deeper into the surface of the wall, it becomes less likely for the magnet to move at all. This, again, means the user will most likely pass over metal fasteners and not be alerted of their presence at all, making the process of locating a stud member take much longer. With lath and plaster, there is virtually no possibility for this device to locate metal fasteners which are usually too deep into the wall for a magnet facing the wrong direction to be moved by.

Of the stud finders in the market today, the Applicant is not aware of a single one that is inexpensive and works accurately when the depth of the fasteners is ⅝" or more. Therefore, there exists a need for an inexpensive stud finder that can accurately work well for lath and plaster walls. Additionally, this device may be used to locate other hidden stud members, as in ceiling joists, floor joists, etc. The present designs fill this need as detailed below.

BRIEF SUMMARY

Provided herein is a device and method that is adapted to determine a location of stud members with lath and plaster walls. A stud finder includes, in one implementation, a body for housing a magnet, with a front section and back section, and a magnet, the magnet being axially magnetized. The body is shaped in order to ensure these axially magnetized poles are always substantially facing the wall, and metal fasteners, when in use. As used in this implementation, the magnet is disposed within about 45 degrees from a surface of the housing, within about 35 degrees from a surface of the housing, within about 25 degrees from a surface of the housing, within about 15 degrees from a surface of the housing, within about 12 degrees from a surface of the housing, within about 10 degrees from a surface of the housing, within about 5 degrees from a surface of the housing. Alternatively, the magnet may be disposed within a range of 1 to 45 degrees from a surface of the housing. When the magnet moves in response to passing over a metal fastener, it snaps against the body, making a noise and alerting the user of a metal fastener. With even minimal magnetic attraction, as is the case with screws buried deep within the wall, the magnet can still be moved, make noise, and alert the user. This allows the device to effectively detect metal fasteners on lath and plaster walls.

The body's internal design can be constructed to increase or maximize the amount of noise made even when the magnet is minimally attracted to a metal fastener. In one implementation, for example, the magnet is in a resting position whenever it is not magnetically attracted to a metal fastener. When in its resting position, it is tilted towards the back section of the body. Within the body are side walls set at a downward angle towards the back section of the body, so that the magnet is pulled towards its resting position by gravity. The side walls may have a specified radius, allowing for a slight curvature throughout its length; though in some embodiments, the side walls may be a straight line or include various radii of a curve along the side wall(s). The angle of the side walls can be specifically designed in various implementations to reduce or minimize the force needed for the magnet to be moved towards the front section of the body.

When the device passes over a metal fastener, the magnet is adapted to move against the front section of the body. When it does this, it hits the front section of the body, creating a noise by contacting the front section of the housing. As the device continues over the metal fastener, the magnet has space to slide within the body to stay magnetically attached to the fastener, which makes additional noise by contacting one or more side wall of the housing. Depending on how fast the user is scanning and the depth of the fastener in the wall, the magnet may hit the opposite side wall as it stays magnetically attached to the fastener, creating even more noise. When the device moves past the metal fastener and the magnet is no longer attracted, the magnet falls back into its resting position. The magnet hits the side wall, and then is pulled by gravity to hit the back section of the body creating further noise. The combination of these noises will often happen rapidly as a user passes over a fastener. Collectively, the sounds together make a more noticeable noise than when they are individual noises, similar to a rattle. Thus, making it easier for the user to hear that the magnet has moved and then determine that a metal fastener, and therefore a stud, has been found.

The stud finder can give the user a device that has a magnet positioned in such a manner that it will be moved by the slightest magnetic force generated from passing over a metal fastener that is buried up to one inch in the wall surface. This helps the user to find studs in two ways.

The user doesn't have to worry about feeling a magnetic pull. Because the magnet is free to move on its own, the user doesn't have to worry whether they're accurately feeling magnetic attraction from a fastener while scanning along the wall. Along the same lines, the user can focus solely on listening and feeling the magnet move within the body. Instead of trying to watch a magnet move or feel it tug towards a fastener, they can concentrate on listening and feeling for the magnet moving within the body. This makes the process of locating a fastener that is buried deep into a wall much easier for the average user.

The specific design of the body allows this stud finder to be an easy-to-use, inexpensive option for lath and plaster walls. Since most magnetic stud finders don't work for nails that are buried more than a ½" into the wall, homeowners generally turn to expensive electronic stud finders.

Additionally, this device is completely enclosed, so there is no worry of contaminants getting into the body and disrupting the magnet. The design of the body also allows the user to store the device easily within a pocket when not in use.

In some embodiments, the design of the front and back sections can be altered. These alterations can be areas raised above the surface for the magnet to contact, to focus the contact to one specific area in an effort to enhance the sound made from the magnet moving.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 3 shows a cross section of the device as it slides down the surface being probed. The magnet stays magnetically attracted to the metal fastener, sliding up within the body.

FIG. 4 shows a cross section of the device as it continues to slide down the surface being probed and past the metal fastener. The magnet loses magnetic attachment with the fastener and falls within the body back into its resting position.

FIG. 5 shows a cross section of an additional embodiment when in use with the magnet in its resting position against the ridge on the back section.

FIG. 6 shows a cross section of said additional embodiment when in use when the magnet is attracted to a metal fastener and moves against the circular bump on the front section.

FIG. 7 shows a cross section of an additional embodiment when in use with the magnet in its resting position against the concave back section.

FIG. 8 shows a cross section of an additional embodiment when in use when the magnet is attracted to a metal fastener and moves against the circular bump on the front section.

FIG. 12 shows a perspective, three-dimensional view of what the inside of an embodiment's front housing with a circular bump would look like.

FIG. 13 shows a perspective, three-dimensional view of what the outside of an embodiment's front housing with a circular bump would look like.

FIG. 14 shows a perspective, three-dimensional view of what the inside of an embodiment's back housing would look like.

FIG. 15 shows a perspective, three-dimensional view of what the inside of an embodiment's back housing with a dome would look like.

FIG. 16 shows a perspective, three-dimensional view of what the outside of an embodiment's back housing with a dome would look like.

FIG. 17 shows a perspective, three-dimensional view of what the inside of an embodiment's back housing with a ridge would look like.

DETAILED DESCRIPTION

Various implementations of a stud finder device may be understood by the specific example embodiments presented in FIGS. 1 to 17.

Figure 1:
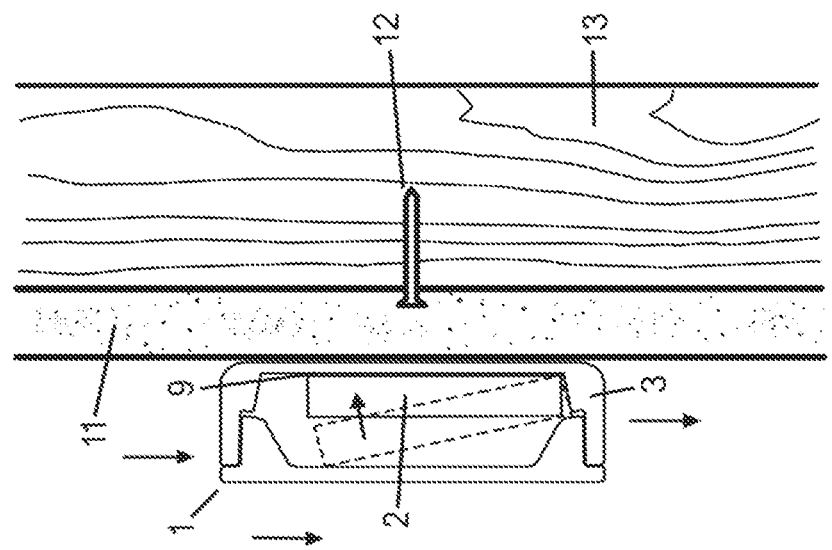
FIG. 1 shows a cross section of the device when in use with the magnet in its resting position.

FIG. 1 shows an embodiment of a stud finder when in use against surface being probed 11 with magnet 2 in its resting position within body 1. Body 1 is comprised of back housing 4 and front housing 3. Outer surface 8 of front housing 3 contacts surface being probed 11 when in use. When in resting position, magnet 2 is guided back to side wall 5 by funnel 6 and leans against back housing 4 at contact point 10. Resting position of magnet 2 ensures that magnetic pole 2a is substantially facing metal fasteners 12 located within surface being probed 11. Magnetic poles 2a are axially magnetized about magnet 2. For example, in a resting position, the magnetic pole 2a of the magnet 2 may be disposed away from the surface of the front housing but substantially facing the front surface to allow it to easily move toward the front surface when a metal component is located within the wall. For example, magnet 2 may be disposed less than about a 45 degree angle of the surface of the front housing 3, less than about a 35 degree angle of the surface of the front housing 3, less than about a 25 degree angle of the surface of the front housing 3, less than about a 15 degree angle of the surface of the front housing 3, less than about a 12 degree angle of the surface of the front housing 3, less than about a 10 degree angle of the surface of the front housing 3, less than about a 5 degree angle of the surface of the front housing 3. Alternatively, magnet 2 may be disposed in a range of a 1 to 45-degree angle of the surface of the front housing 3. In this manner, at least a portion of the face of the magnet (e.g., corresponding to a pole of the magnet) is offset from the surface of the housing by the angle of the magnet from the surface of the front housing in a first, rest position and brought into contact with the surface in a second, engaged position when an attractive force generated between the magnet and a metal object draw the face of the magnet toward surface and the wall. Where the angle of the magnet with respect to the surface of the front housing is less than 45 degrees, the face/pole of an axial magnet is "substantially facing" the front surface of the housing and the lesser the angle, the stronger the attractive force between a metal object and the face/pole since the pole is positioned closer to the surface and, in turn, the surface being examined.

Figure 2:
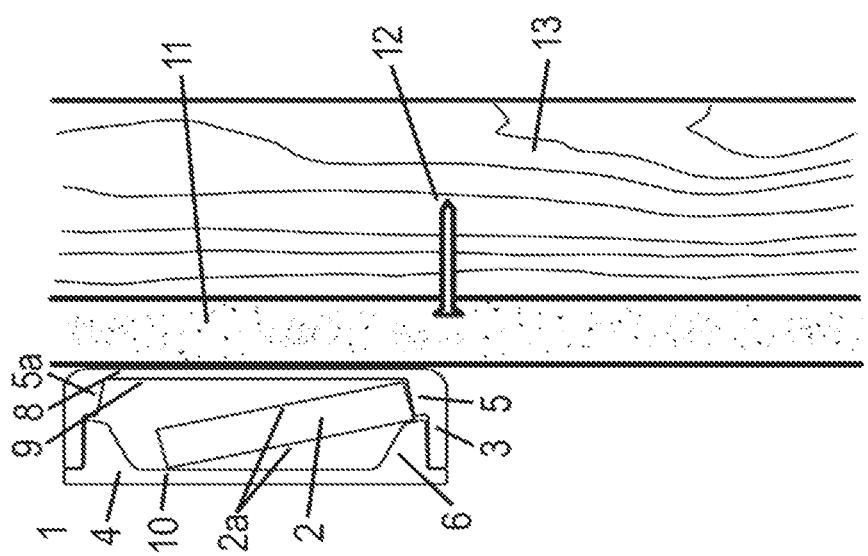
FIG. 2 shows a cross section of the device when in use when the magnet is attracted to a metal fastener and has moved against the front section.

In FIG. 2, as body 1 slides down surface being probed 11, it moves closer towards metal fastener 12. When the magnetic attraction is strong enough, magnet 2 rapidly moves within body 1 towards metal fastener 12. Magnet 2 strikes inner surface 9 of front housing 3 creating a noise to alert the user of metal fastener 12.

In FIG. 3, as body 1 continues to slide down surface being probed 11 with magnet 2 still magnetically attached to metal fastener 12, magnet 2 moves within body 1. Magnet 2 slides from side wall 5 to side wall 5a. Magnet 2 hits opposite side wall 5a creating additional noise to alert the user of metal fastener 12.

In FIG. 4, as body 1 continues to slide down surface being probed 11, it moves past metal fastener 12. As it does this, magnet 2 loses magnetic attraction to metal fastener 12. When the magnetic attraction can no longer support the weight of magnet 2, it falls off inner surface 9. As it falls, it is guided back into its resting position by the shape and angle of funnel 6 and side wall 5. When this happens, magnet 2 creates additional noise as it contacts these surfaces to further alert the user that body 1 has moved over metal fastener 12. The combination of all these noises made from magnet 2 moving within body 1 when passing over metal fastener 12 makes a more noticeable rattle sound to alert the user of metal fastener 12.

FIG. 5 displays an additional embodiment of the present invention. Back housing 4 has ridge 7, that magnet 2 leans against while in resting position. Ridge 7 becomes contact point 10 for magnet 2 to concentrate any noise made when magnet 2 is moving back to its resting position.

In FIG. 6, body 1 moves over metal fastener 12. Magnet 2 becomes magnetically attracted to metal fastener 12 and contacts circular bump 14 to concentrate any noise made from magnet 2 moving towards metal fastener 12.

FIG. 7 shows an additional embodiment of the present invention. Back housing 4 has dome 15 that magnet 2 leans against when in its resting position. Dome 15 is meant to enhance any noise made when magnet 2 is returning to its resting position after being attracted to metal fastener 12.

In FIG. 8, body 1 moves over metal fastener 12. Magnet 2 becomes magnetically attracted to metal fastener 12 and contacts circular bump 14 to concentrate any noise made from magnet 2 moving towards metal fastener 12.

Figure 9:
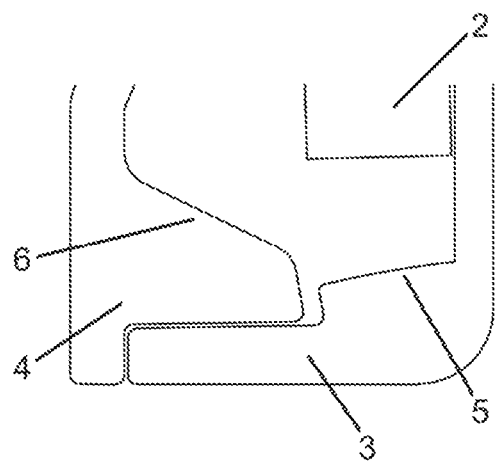
FIG. 9 shows a close-up cross section view of the magnet magnetically attracted to a metal fastener.
Figure 10:
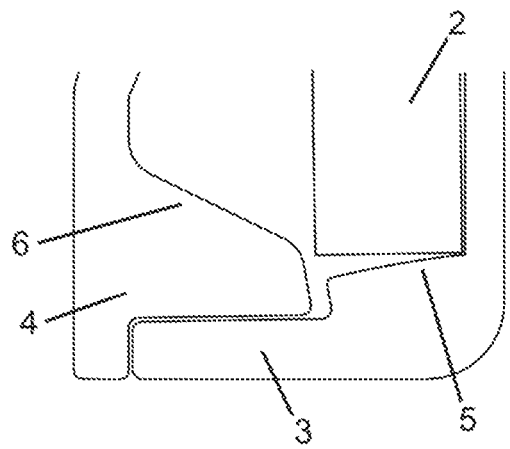
FIG. 10 shows a close-up cross section view when the magnet loses magnetic attraction to the metal fastener and falls towards the funnel and side wall.
Figure 11:
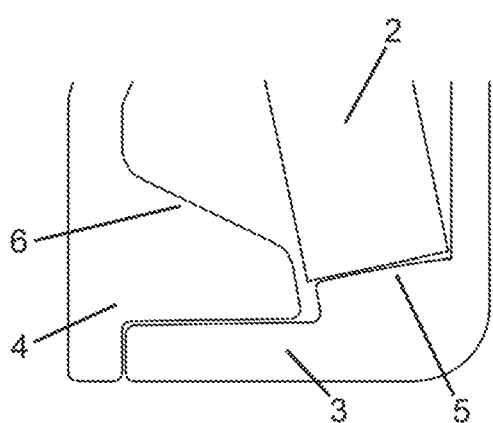
FIG. 11 shows a close-up cross section view of the magnet being guided back to its resting position by the angled side wall.

FIG. 9 shows a close-up view of funnel 6 and side wall 5 with magnet 2 in the position as earlier displayed in FIG. 3. Side wall 5 has a specified radius or length. As magnet 2 is magnetically released in FIG. 10, it falls to side wall 5 where the slope and shape of side wall 5, as well as funnel 6, start to guide it towards its resting position. Then in FIG. 11, magnet 2 has reached its final resting position.

Figure 13:
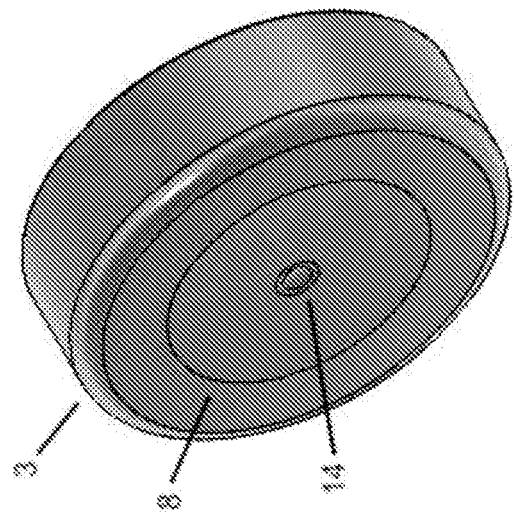
Figure 12:
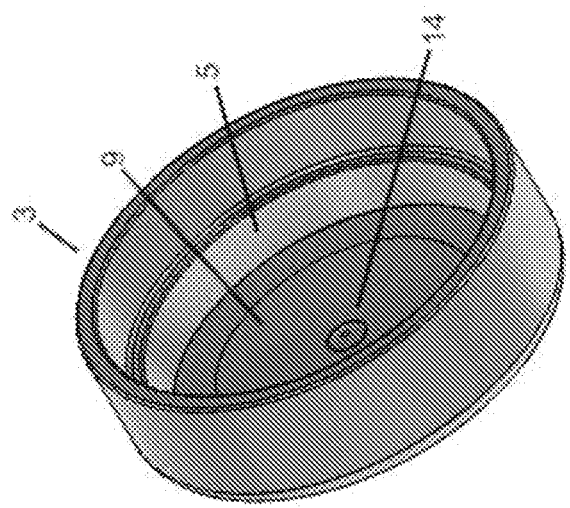

FIG. 12 shows a perspective, three-dimensional view of an embodiment's front housing 3, with circular bump 14 on inner surface 9. This shows that there is no specific way to correctly hold body 1 when in use. Then FIG. 13 shows the same embodiment of front housing 3 from a different perspective so that outer surface 8 is visible.

Figure 15:
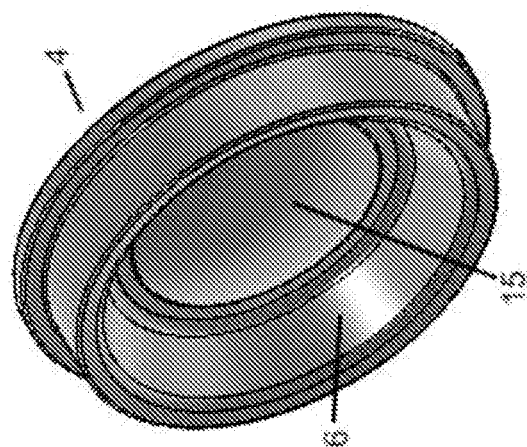
Figure 14:
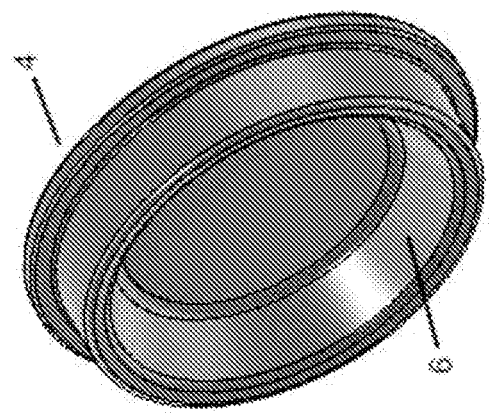
Figure 17:
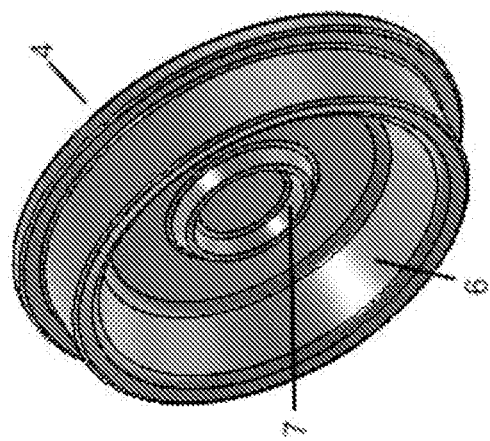
Figure 16:
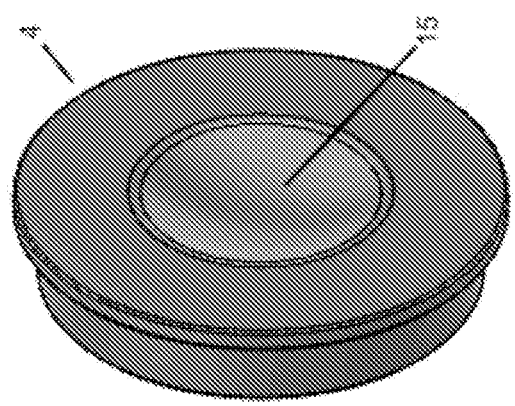

FIG. 14 shows a perspective, three-dimensional view of the inside of an embodiment's back housing 4, showing that funnel 6 functions properly no matter how the device is held. FIG. 15 shows the same perspective, three-dimensional view of the inside of an additional embodiment of back housing 4 with dome 15 for purposes previously discussed. FIG. 16 shows this same embodiment of back housing 4 with dome 15 from a different perspective. FIG. 17 shows a perspective, three-dimensional view of the inside of an additional embodiment of back housing 4 with ridge 7 for purposes previously discussed. Ridge 7 is designed so that it functions properly no matter how the device is held.

Terms of approximation, such as substantially, generally or the like, are used as terms of approximation and not as terms of degree, and are intended to account for the inherent deviations in measured or calculated values that would be recognized by those of ordinary skill in the art.

Although implementations have been described above with a certain degree of particularity, those skilled in the art could make numerous alterations to the disclosed embodiments without departing from the spirit or scope of this invention. For example, a housing, body or case may comprise any number of components (e.g., one or more) regardless of the number of components described in the specific example embodiments presented herein. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A device adapted to locate a hidden stud member comprising:
   a body defining a cavity, the body comprising:
      a front housing comprising a front housing outer surface and a front housing inner surface,
      a side wall extending away from the front housing inner surface,
      a rear housing comprising a rear housing inner surface opposed to the front housing inner surface, and
      an extension comprising an angled surface extending away from the rear housing inner surface toward the side wall; and
   a magnetic component disposed within the cavity, the magnetic component comprising a first front magnetic surface, a second rear magnetic surface and a side surface extending between the first front magnetic surface and the second rear magnetic surface, wherein the first front magnetic surface is at least partially spaced from the front housing inner surface and the angled surface of the extension is configured to position the side surface of the magnet adjacent the side wall is in a first rest position,
   wherein as the front housing is moved into proximity with a metal object, the first front magnetic surface is configured to move toward the front housing inner surface to a second engaged position in response to an attractive force generated between the magnetic component and the metal object.

2. The device of claim 1 wherein the magnetic component is disposed at an angle of less than 45 degrees from the front wall at the first rest position.

3. The device of claim 2 wherein the angle is less than 15 degrees from the front wall at the first rest position.

4. The device of claim 3 wherein the angle is less than 5 degrees from the front wall at the first rest position.

5. The device of claim 1 wherein the magnetic component comprises an axially magnetized magnet.

6. The device of claim 5 wherein the first front magnetic surface of the axially magnetized magnet comprises a pole facing the front wall in the second engaged position.

7. The device of claim 1 wherein the magnetic component strikes the front wall in the second engaged position when the device locates the metal object in the hidden stud member.

8. The device of claim 1 wherein the side wall has at least one radius biasing at least a portion of the magnetic element away from the front housing inner surface.

9. The device of claim 1 wherein the body is completely enclosed.

10. The device of claim 1 wherein the extension comprises a funnel extending into the cavity and adapted to guide the magnetic component toward the side wall in the first rest position when the attractive force is removed.

11. A method of locating a hidden stud member comprising:
   providing a device comprising:
      a body defining a cavity, the body comprising:
         a front housing comprising a front housing outer surface and a front housing inner surface,
         a side wall extending away from the front housing inner surface,
         a rear housing comprising a rear housing inner surface opposed to the front housing inner surface, and
         an extension comprising an angled surface extending from the rear housing inner surface toward the side wall; and
      a magnetic component disposed within the cavity, the magnetic component comprising a first front magnetic surface, a second rear magnetic surface and a side surface extending between the first front magnetic surface and the second rear magnetic surface, wherein the first front magnetic surface is at least partially spaced from the front housing inner surface wall and the angled surface of the extension is configured to position the side surface of the magnet adjacent the side wall is in a first rest position,
   moving the front wall of the device across a surface;
   detecting a metal object disposed below the surface when an attractive force generated between the magnetic component and the metal object moves the magnetic component toward and into contact with the front housing inner surface to a second engaged position.

12. The method of claim 11 wherein the magnetic component is disposed at an angle of less than 45 degrees from the front wall at the first rest position.

13. The method of claim 12 wherein the angle is less than 15 degrees from the front wall at the first rest position.

14. The method of claim 13 wherein the angle is less than 5 degrees from the front wall at the first rest position.

15. The method of claim 11 wherein the magnetic component comprises an axially magnetized magnet.

16. The method of claim 15 wherein the first front magnetic surface of the axially magnetized magnet comprises a pole facing the front wall in the second engaged position.

17. The method of claim 11 wherein the magnetic component strikes the front wall in the second engaged position when the device locates the metal object in the hidden stud member.

18. The method of claim 11 wherein the side wall has at least one radius biasing at least a portion of the magnetic element away from the front housing inner surface.

19. The method of claim 11 wherein the body is completely enclosed.

20. The method of claim 11 wherein the body comprises a funnel extending into the cavity and adapted to guide the magnetic component to the first rest position when the attractive force is removed.

21. The device of claim 1 wherein the side wall is integral with the front housing.

22. The device of claim 1 wherein the extension is integral with the rear housing.

23. The method of claim 11 wherein the side wall is integral with the front housing.

24. The method of claim 11 wherein the extension is integral with the rear housing.

* * * * *